Jan. 28, 1964   W. P. LUTHER   3,119,942
ELECTRIC MOTOR FOR HAND HELD APPLIANCE
Filed Oct. 3, 1960   2 Sheets-Sheet 1
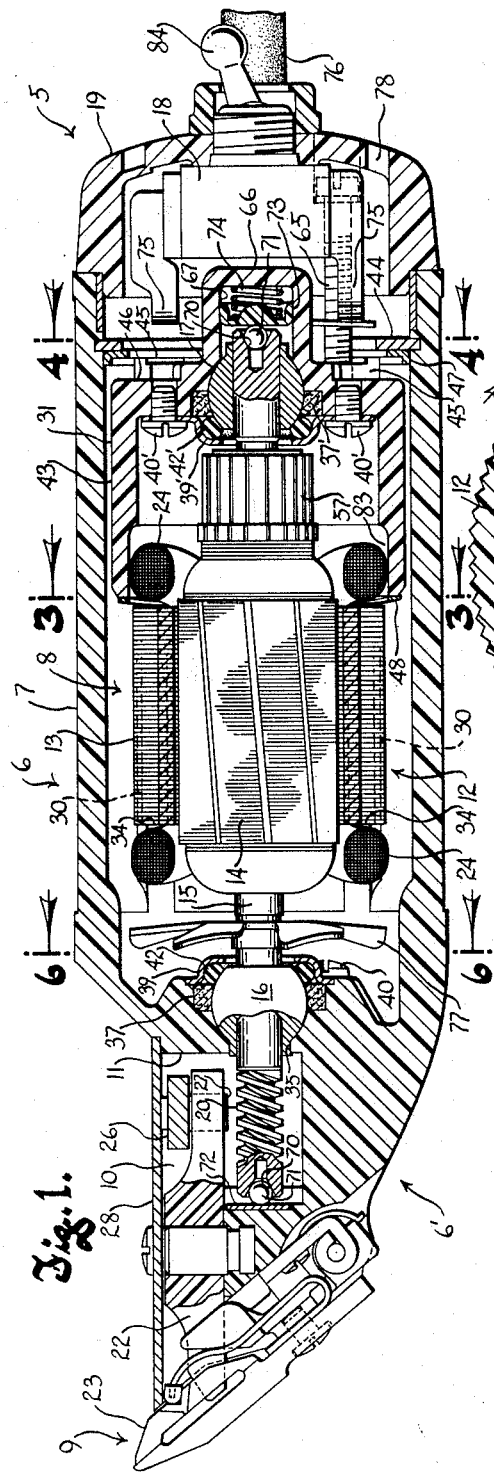
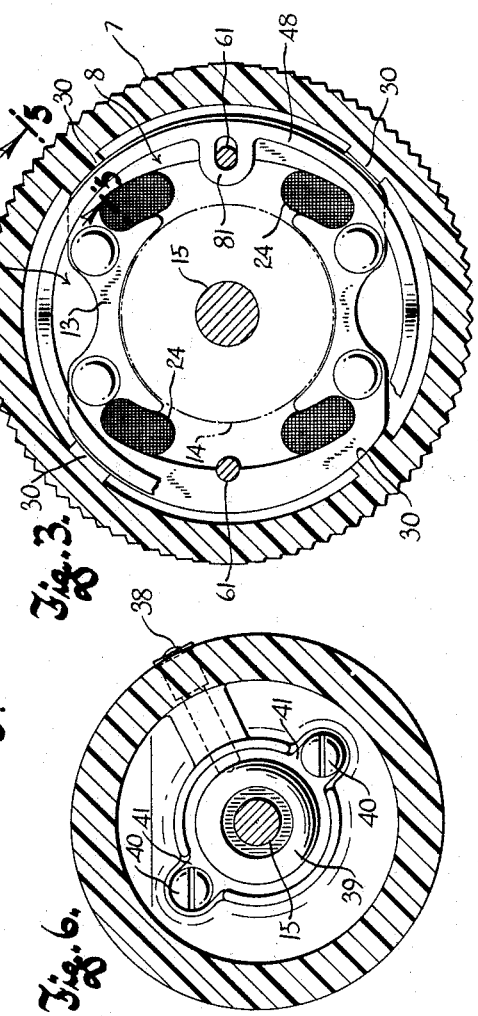
Inventor
William P. Luther
By
Attorney Jan. 28, 1964  W. P. LUTHER  3,119,942
ELECTRIC MOTOR FOR HAND HELD APPLIANCE
Filed Oct. 3, 1960  2 Sheets-Sheet 2
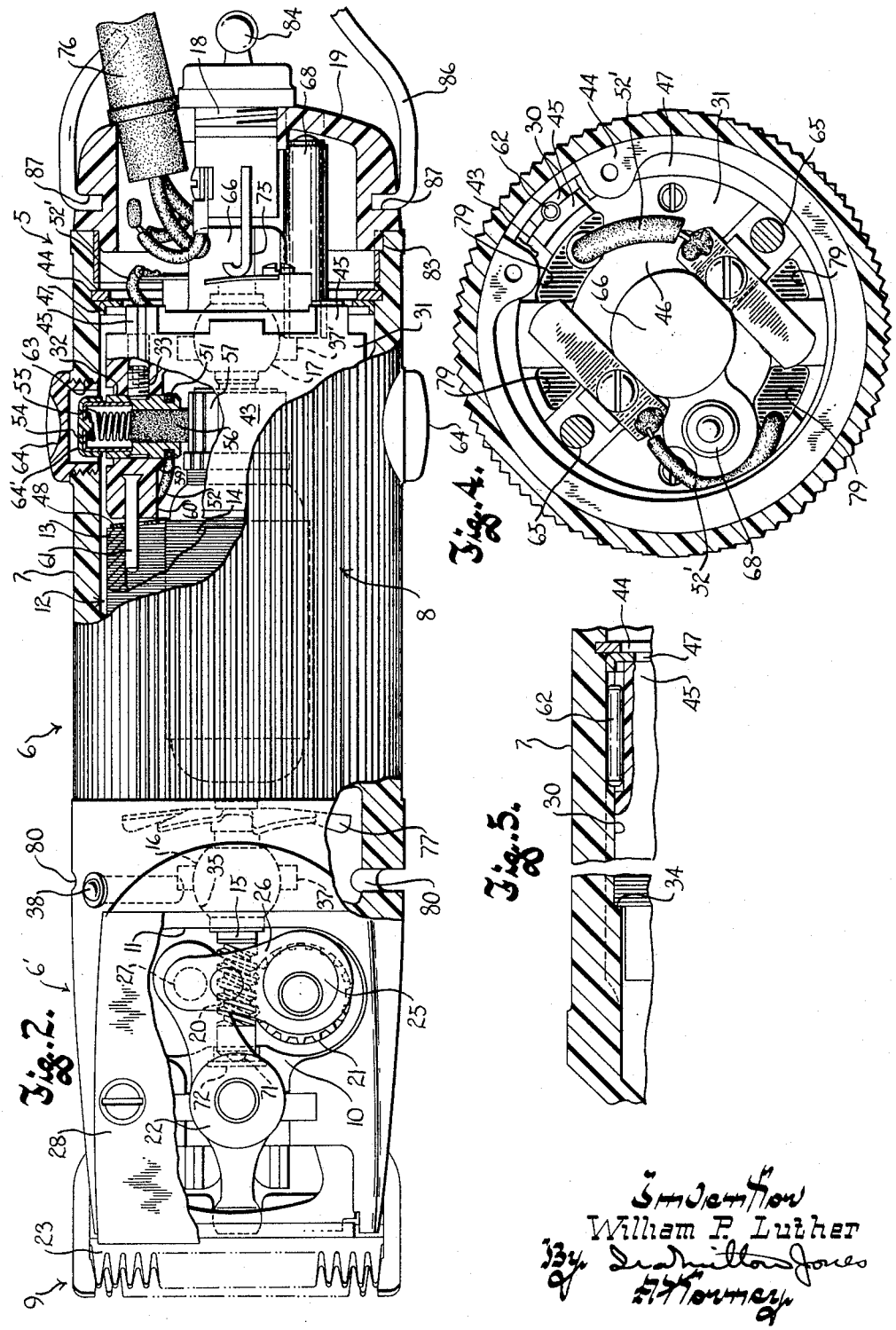
INVENTOR
William P. Luther
By
ATTORNEY United States Patent Office 3,119,942
Patented Jan. 28, 1964

3,119,942
ELECTRIC MOTOR FOR HAND HELD APPLIANCE
William P. Luther, Racine, Wis., assignor to John Oster
Manufacturing Company, Milwaukee, Wis., a corporation of Wisconsin
Filed Oct. 3, 1960, Ser. No. 60,207
13 Claims. (Cl. 310—50)

This invention relates to hand held electric power tools of the type which includes hair clippers, and refers more particularly to a novel electric motor construction for electric hair clippers and the like.

In general it is an object of this invention to provide a very compact electric motor of the type having a housing that comprises the handle of a hand held electric tool or appliance, such as an electric hair clipper, wherein the housing not only encloses the motor and insulates its electrically conductive portions from contact with the hand of an operator, but also supports its shaft bearings and stator core and maintains them in coaxial alignment.

More specifically, it is an object of this invention to provide a motor having a housing member which comprises the handle of a small hand held tool or appliance, wherein the housing member directly supports the stator core of the motor and one of its shaft bearings to thus maintain them in coaxial relationship, and wherein an end frame for the motor, which supports its brushes and another of its shaft bearings, is likewise supported by the housing member to be maintained thereby in coaxial relationship with the stator core and said one shaft bearing.

It is also a specific object of this invention to provide a motor of the character described which is very easily assembled and disassembled, and which is therefore inexpensive to manufacture and to service, and wherein the major components of the motor are held in the proper assembled relationship to one another by means of a housing member which encloses the motor elements and coaxially supports them.

A further specific object of this invention resides in the provision of a motor having the features described above, and wherein the motor shaft is confined against end play by structure which is simple, inexpensive and dependable, and which does not interfere with rotation of the shaft.

Still another object of this invention is to provide a motor of the character described having an end frame which supports its brush holders and one of its shaft bearings, wherein said end frame and the stator core of the motor are held in the proper coaxial relation to one another by a housing member that encloses the motor, and wherein the end frame and the stator core are maintained in a predetermined axially spaced relationship by very simple biasing means which reacts between them and urges them into engagement with abutments in the housing member.

A further object of this invention resides in the provision of a small motor construction of the character described wherein provision is made for maintaining an air gap between the armature and the inner surface of the stator core which is of uniform size around the entire circumference of the armature and along its entire length, even though the laminations of the stator core may be tilted at an oblique angle to its axis.

It is also a specific object of this invention to provide a small electric motor having the features described above and which is particularly suited for powering small hand held tools and appliances because all current carrying parts of the motor are doubly insulated from the hand of the person using a tool or appliance that incorporates the motor.

With the above and other objects in view which will appear as the description proceeds this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiments of the invention constructed according to the best mode so far devised for the practical application of the principles thereof, and in which:

FIGURE 1 is a longitudinal sectional view of an electric hair clipper embodying the principles of this invention.

FIGURE 2 is a top elevational view of the clipper with portions broken away and shown in section;

FIGURE 3 is a sectional view taken on the plane of the line 3—3 in FIGURE 1;

FIGURE 4 is a sectional view taken on the plane of the line 4—4 in FIGURE 1;

FIGURE 5 is a fragmentary sectional view taken along the line 5—5 in FIGURE 3; and FIGURE 6 is a sectional view taken on the plane of the line 6—6 in FIGURE 1.

Referring now more particularly to the accompanying drawings, the numeral 5 designates generally a hand held electric motor driven tool or appliance, which in this case is shown, for purposes of illustration as an electric hair clipper. The appliance has a main body member 6, the main portion of which comprises a housing member having a substantially tubular side wall 7 that encloses an electric motor 8 and serves as a handle for the tool. A forward extension 6' of the main body member provides for the mounting of a cutter head assembly 9 at the front of the device and defines a transmission housing 10, the latter being separated from the interior of the housing member by a transverse front wall 11. The main body member is formed of insulating material, and can readily be molded as a unit.

The electric motor 8 which powers the appliance comprises, in general, a stator 12 having windings 24 on a core or frame 13 of laminated magnetic material, and a rotor or armature 14 that has its shaft 15 journaled in front and rear bearings 16 and 17. A switch 18 for controlling energization of the motor is mounted in an end cap 19 of insulating material that complements the main body member and closes the rear end of its housing portion.

The front end portion of the motor shaft 15, which projects forwardly through the front wall 11 of the housing member into the transmission housing 10, is formed as a worm 20 which meshes with a worm wheel 21 that is mounted in the transmission housing for rotation on an axis transverse to that of the motor shaft. Also located in the transmission housing is a medially fulcrumed actuating lever 22 by which the movable blade 23 of the more or less conventional cutter head assembly 9 is reciprocatingly driven from an eccentric 25 on the worm wheel 21, through a link 26. The eccentric 25 is journaled in one end portion of the link 26, while the other end portion of the link is connected to the rear end of the actuating lever 22 by a pivot pin 27, so that rotation of the eccentric is thus translated into swinging motion of the lever from side to side. The front end portion of the lever 22 is received in a slot in the movable blade 23, to provide a driving connection therewith which permits the cutter head to be readily detached from the main body member.

The transmission housing is closed at its top by a cover plate 28 which can also serve as a name plate, and which cooperates with the bottom wall of the transmission housing to confine the worm wheel 21, the link 26 and the lever 22 against up and down displacement.

At its interior the tubular side wall 7 of the main body member has accurately formed integral ribs 30 that project radially inwardly at circumferentially spaced locations and extend substantially the full length of the housing member to support both the stator core 13 and an end frame 31 that carries brush holders 32 and the rear rotor shaft bearing 17. Since the front rotor shaft bearing 16 is coaxially supported in the front wall 11 of the main body member, and the inside and outside diameters of the stator core 13 are accurately formed concentrically with one another, support of the stator core and end frame by the ribs 30 disposes the stator core coaxially with the shaft bearings, and therefore insures that the air gap between the stator core and the rotor will be uniform all around the circumference of the latter. Such uniformity of the air gap exists along the entire length of the stator core, even though its laminations may be inclined obliquely to its axis, because the ribs 30 engage the outer surface of the stator core along its full length.

Each of the ribs 30 has a rearwardly facing shoulder 34 near its front end, against which the front of the stator core engages to axially locate the stator with respect to the housing member, as is explained hereinafter.

The front wall 11 of the main body member has a bore 35 therethrough, coaxial with the tubular wall 7, through which the front end portion of the rotor shaft 15 projects into the transmission housing, and in which the front bearing 16 is seated. The bearing has a substantially spherical exterior, and the bore 35 has a corresponding concave rearward divergence to accommodate the bearing and maintain it coaxial with the stator while permitting the bearing to have a limited degree of swiveling motion by which it is rendered self-aligning. Surrounding the medial portion of the bearing is a felt washer 37, received in a rearwardly opening counterbore in the front wall 11, which provides for lubrication of the bearing. A conventional oiler 38, received in a radially extending boss on the front wall and having its inlet accessible at the exterior of the tubular side wall 7, provides for conduction of oil to the felt washer. It will be understood that the bearing is formed of porous material so that lubricant is conducted through the bearing metal from the felt washer to the shaft journaled in the bearing.

The bearing 16 is held seated in the divergent portion of the bore 35 by means of a substantially cup-shaped annular retainer 39 that is secured behind the bearing member by means of screws 40 that extend forwardly through apertured radially outwardly projecting lugs 41 on the retainer and into the front wall of the housing member. A resilient O-ring 42, compressively confined between the retainer 39 and the bearing, insures that the bearing will be firmly held in its seat and also provides an oil seal that prevents excessive leakage of lubricant out of the felt washer 37, rearwardly along the exterior of the bearing and past its retainer.

The end frame 31 is formed of insulating material and can be molded as a unit. It is substantially cup-shaped, having a cylindrical side wall 43, an end wall 46, and a cup-shaped coaxial extension 66 on its end wall which defines a well 67 that opens forwardly through the end wall.

The cylindrical side wall 43 of the end frame is closely engaged by the ribs 30 in the housing member, so that it is maintained coaxial with the stator frame by them. Axial displacement of the end frame rearwardly out of the housing member is prevented by means of a split spring ring 44 engaged in an inwardly opening circumferential groove in the tubular side wall 7 at the rear thereof. The end frame has four lugs 45 that project rearwardly from its rear wall 46 and engage against the front face of a cup-shaped washer 47, which in turn bears against the split ring 44, the purpose of the washer 47 being to facilitate insertion of the split ring into its groove during assembly of the machine.

The end frame is biased rearwardly into engagement with the washer 47, and thus held in an axial location defined by the split spring ring 44, by means of a spring ring 48 which fits closely within the tubular housing wall, between the adjacent ends of the stator core and end frame, and which is bent out of flatness to react against the stator core and end frame. It will be apparent that the spring ring 48 also biases the stator core forwardly into engagement with the rearwardly facing shoulders 34 on the ribs 30, and thus maintains both the end frame and the stator core in predetermined locations axially of the main housing member.

The brush holders 32 comprise conductive tubes that are received in closely fitting radial bores in the cylindrical side wall of the end frame, at diametrically opposite locations. Preferably they are secured in place by means of set screws 33 threaded into the end frame from the rear thereof. Clip terminals 51 embrace the brush holder tubes in circumferential grooves near their inner ends to provide for the connection of conductors 52 to them. A conductive cup-shaped brush retainer 54 is press fitted into the outer end portion of each brush holder tube to receive the reaction of a compression spring 55 by which the brush 56 is biased inwardly toward engagement with the commutator 57, and to provide a good current path from the brush holder tube to the spring 55 and thus to the brush.

To insure secure mounting of the brush holder tubes, the end frame has inwardly projecting bosses 59 formed integrally with its side wall and in which the brush holder tubes are set. Extending forwardly from each of the brush holder bosses 59, along the inner surface of the end frame side wall, is an integral stud boss 60 from which a pin or stud 61 projects forwardly beyond the front edge of the end frame to engage in an inwardly opening groove in the inner surface of the stator core. The pins 61 extend through apertured radially inwardly projecting lugs 81 on the spring ring 48 and of course hold the stator core against rotation relative to the end frame. The end frame is in turn held against rotation relative to the housing member by means of a key pin 62 which is engaged in opposing longitudinally extending grooves, one in the outer surface of the cylindrical side wall of the end frame, near its rear end, and the other in the inner face of one of the ribs 30 on the tubular side wall of the housing member.

The key pin 62 cooperates with the ribs 30 and the split spring ring 44 to very accurately locate the end frame in the main housing member, so that the brush holders 32 are aligned with brush access holes 63 in the tubular side wall of the main housing member. The holes 63 are closed by screw-in caps 64 of insulating material which cooperate with caps 64' of insulating material, fixed over the outer end portions of the metal brush retainers 32, to thus provide a double insulation of the operator's hand from current carrying portions of the brush assembly.

Since the end frame is held against both rotation and axial motion relative to the main housing member, the end cap 19, which telescopes into the rear portion of the main housing member, behind the split spring ring 44, can be secured in place by fastening it to the end frame with shoulder screws 65 engaged in bosses on the rear wall 46 of the end frame.

The rear rotor shaft bearing 17 is coaxially seated in the forwardly divergent mouth of the well 67 defined by the cup-shaped rearward extension 66 on the rear wall of the end frame. The rear bearing is secured in place by an annular retainer 39' that is fastened to the rear wall 46 of the end frame by means of screws 40', in the same way that the front bearing 16 is retained in the front wall 11 of the main body member. Likewise an O-ring 42' is compressively confined between the rear bearing 17 and its retainer 39', and a felt lubricating washer 37' surrounds the medial portion of the rear bearing. Oil is brought to the washer 37' through an oiler 68, received in a snugly fitting bore in the rear wall 46 and extending rearwardly to have its inlet accessible through a hole in the end cap 19.

Unusually smooth and quiet operation of the motor is insured by reason of the fact that its shaft 15 is restrained against end play without interfering with its freedom for rotation. For this purpose each end of the shaft has a coaxial outwardly divergent well 70 in which is seated a ball 71, the diameter of the ball being such that when it is fully seated in the well it projects a short distance beyond the adjacent end of the shaft. Seated in an upwardly opening slot at the front of the transmission housing is a rearwardly facing abutment plate 72 against which the ball 71 at the front end of the shaft engages to define the forward limit of axial shaft motion. In the forwardly opening well 67 in the end frame, behind the rear bearing 17, is an axially slidable plunger 73 which is biased forwardly into engagement with the ball 71 at the rear of the shaft by means of a coiled compression spring 74 that reacts between said plunger and the bottom of the well. The direction of shaft rotation is so chosen that the worm 20 cooperates with the forwardly biased plunger 73 in urging the shaft forwardly, to maintain the front ball 71 in engagement with the front bearing abutment plate 72; and of course the spring 74 maintains the plunger 73 engaged with the rear ball 71 to thus prevent any possibility of axial play in the shaft. Because of the point contact of the balls 71 with the abutment plate 72 and the plunger 73, the confinement of the shaft against endwise motion is accomplished without imposing any appreciable rotation inhibiting friction upon the shaft.

The connectors 75 that connect the switch 18 and power cord 76 in the end cap 19 with the conductors 52' that lead to the stator windings are of the quickly disengageable contact type disclosed in the patent to John Oster, No. 2,158,145, by which connections are automatically established when the end cap 19 is secured in place and disestablished when the end cap is removed from the main housing member.

Cooling of the motor is provided for by means of a fan 77, secured to the motor shaft 15 between the armature and the front bearing, and which draws air into the housing through slots 78 in the end cap 19, and slots 79 in the rear wall 46 of the end frame through which conductors 52 also extend. After flowing across the armature and stator windings, the cooling air is expelled through outlet ports 80 in the tubular side wall of the housing member, directly behind the front wall 11.

It will be apparent that assembly of the motor of this invention is quite simple. The front bearing 16 is seated in the front wall 11 of the main housing member, the felt washer 37 and the O-ring 42 are respectively set in place around the bearing, and the retainer 39 is fastened in place with the screws 40. Then the rotor assembly, with the fan 77 installed on its shaft and the balls 71 pressed into the wells 70 in the end portions of its shaft, can be inserted axially into the housing. Since the worm 20 is integral with the rotor shaft and has a diameter no larger than that of the front journal portion of the shaft, it will readily pass through the front bearing 16 and into the transmission housing 10 until the front ball 71 engages against the rearwardly facing abutment 72.

The oiler 68, the plunger bias spring 74 and the plunger 73 are installed in the end frame, and the necessary wiring connections are made between the brush holders, the stator windings 24 and the elements of the connectors 75 that are carried by the end frame. The end frame, the stator and the spring ring 48 between them, can be sub-assembled outside of the housing by reason of the fact that the forwardly projecting studs or pins 61 on the end frame engage in grooves in the stator core through apertured inwardly projecting lugs 81 in the spring ring. This sub-assembly is inserted axially into the main housing member, and, if necessary, is rotated relative to the main housing member until the mating grooves in the end frame and the main housing member are opposite one another to receive the key pin 62 which is then inserted into these grooves. During insertion of the stator-end frame sub-assembly into the main housing member, care must of course be taken that the rear end portion of the rotor shaft 15 passes through the rear bearing 17, but this is not difficult to do because the front bearing 16 tends to hold the shaft coaxial with the tubular housing wall 7.

Next the cup-shaped washer 47 is inserted behind the end frame, and the split spring ring 44 is engaged in its receiving groove in the main housing member. At this point, if desired, the end cap 19, with the switch 18 in place therein, can be installed. To insure proper rotational orientation of the end cap relative to the main housing member, the front end portion of the end cap, which is telescopingly received in the rear end portion of the main housing member, can have a small radially projecting locating lug 83 which engages in a closely fitting inwardly opening slot in the main housing member.

As soon as the end frame is secured in the main housing member by installation of the split spring ring 44, the brushes and their springs can be inserted into the brush holder tubes, through the brush access holes 63 in the tubular side wall of the main housing member, and the conductive brush retainers 54 can be pressed into place. The insulating brush cover caps 64 can then be screwed into the brush access holes to complete the assembly of the motor portion of the device.

Attention is directed to the fact that the ribs 30 hold the field windings 24 on the stator core radially spaced from the tubular side wall 7 of the main housing member, and thus provide an air space which cooperates with the insulation on the windings and the insulating tubular wall 7 to doubly insulate current carrying parts of the stator from contact with the hand of an operator using the tool. Since the end frame is formed of insulating material, the commutator, which is disposed therein, as well as the conductors 52 which connect the brushes with the stator windings, are likewise doubly insulated from the hand of an operator. In this connection it will also be observed that the front end portion of the insulating end frame embraces the rear portion of the stator windings, as at 83.

To carry this feature of double insulation throughout the entire structure of the tool, the switch 18 is preferably provided with an actuator 84 of non-conductive plastic material, and the conventional metal bail 86 by which the tool can be hung up when not in use has its end portions engaged in wells or blind holes 87 in the end cap 19.

From the foregoing description, taken together with the accompanying drawings, it will be apparent that this invention provides an electric motor for a hand held power tool or appliance of the class which includes electric hair clippers, wherein a housing for the motor serves as a handle for the tool or appliance which is powered by the motor and also supports the stator core of the motor and the bearings in which its rotor shaft are journaled, to maintain the bearings and stator core in coaxial relationship. It will also be apparent that in the motor of this invention the air gap between the armature and the inner surface of the stator core is of uniform size around the entire circumference of the armature and along its entire length, even though the stator laminations may be tilted at an oblique angle to its axis; end play of the rotor shaft is prevented without interfering with free rotation of the rotor; and all electrically conductive parts of the motor are doubly insulated from the hand of an operator using the tool.

What is claimed as my invention is:

1. A hand held power tool of the type which includes electric hair clippers, having an elongated housing which is adapted to be held in the palm of the hand and which encloses an electric motor comprising a rotor having its shaft journaled in coaxial spaced apart front and rear bearings in the housing and a wound stator having an annular core of magnetic material which is mounted in the housing coaxially with the rotor, said hand tool being further characterized by the following:
  (A) the housing having
    (1) a substantially tubular side wall by which the stator core is embraced and coaxially supported,
    (2) means near the front of the housing providing a coaxial front rotor shaft bearing suport,
    (3) a rearwardly facing thrust abutment forwardly of said bearing support and coaxial therewith, and
    (4) another rearwardly facing abutment spaced radially outwardly from the bearing support and engageable with a forwardly facing surface on the stator core;
  (B) an end frame in the housing, behind the stator core, engaging the side wall of the housing at circumferentially spaced locations and is thereby supported coaxially with the stator core, and said end frame having
    (1) means providing a coaxial support for the rear rotor shaft bearing, and
    (2) a forwardly facing thrust abutment rearwardly of said bearing support and coaxial therewith;
  (C) means releasably engaged with the tubular side wall of the housing, behind the end frame, providing another forwardly facing abutment in the housing that prevents rearward displacement of the end frame out of the housing;
  (D) yielding bias means reacting between the stator core and the end frame to urge the stator core forwardly into engagement with said other rearwardly facing abutment and to urge the end frame rearwardly into engagement with said other forwardly facing abutment;
  (E) means on each end of the rotor shaft defining an end thrust bearing with a surface which converges axially outwardly to a point coaxial with the shaft; and
  (F) other biasing means reacting between the end thrust bearing at the rear end of the shaft and said forwardly facing thrust abutment to urge the end thrust bearing at the front end of the shaft into engagement with the rearwardly facing thrust abutment, thereby preventing end play of the shaft and maintaining the rotor in a predetermined axial relation to the stator regardless of the axial relationship of the end frame to the stator.

2. The hand tool of claim 1, further characterized by the fact that the means providing said other forwardly facing abutment comprises a split ring spring retainer engaged in an inwardly opening circumferential groove in the tubular side wall of the housing; and further characterized by the fact that the first designated yielding bias means comprises a spring ring bent out of flatness to have portions engaging the stator core and other portions engaging the end frame.

3. The hand held tool of claim 1, further characterized by the fact that the end frame provides brush holder supports for brushes that extend substantially radially from the rotor; and further characterized by caps of insulating material, screw threaded into brush access holes in the tubular side wall of the housing member, and which caps protect the brushes and insulate them from contact by a person holding the tool.

4. In a fractional horsepower electric motor having a stator with an annular core of magnetic material and a rotor coaxially rotatable in the stator core on a shaft journaled in spaced apart front and rear bearings:
  (A) a housing member having
    (1) a tubular side wall by which the stator core is embraced and held coaxial with the housing member,
    (2) means providing a coaxial support for the front rotor shaft bearing in front of the stator core, and
    (3) means providing a rearwardly facing thrust abutment in front of and coaxial with the front bearing support;
  (B) an end frame embraced by the tubular side wall of the housing member and held thereby in coaxial relation to the stator core, behind the latter, said end frame having
    (1) a coaxial support for the rear rotor shaft bearing, and
    (2) means defining a forwardly facing thrust abutment behind and coaxial with said bearing support;
  (C) means on the housing member cooperating with the stator core and the end frame to confine them against axial displacement relative to the housing member;
  (D) means on each end of the rotor shaft defining an end thrust bearing with a surface that converges axially outwardly to a point coaxial with the shaft; and
  (E) biasing means reacting between one of said thrust abutments and its adjacent end thrust bearing to urge the shaft in the axial direction to maintain the other end thrust bearing engaged with its adjacent thrust abutment and thereby prevent axial play of the shaft.

5. The electric motor of claim 4, wherein the end frame has a coaxial well therein which opens forwardly to the rear bearing support and the bottom of which defines said forwardly facing thrust abutment; and wherein said biasing means comprises a plunger axially slidable back and forth in said well and providing a forwardly facing surface engageable with the end thrust bearing at the rear end of the shaft, and a spring reacting between said plunger and the forwardly facing thrust abutment.

6. The electric motor of claim 4, wherein each of said end thrust bearings comprises a ball received in a coaxial outwardly divergent well opening to an end of the rotor shaft and which projects axially beyond its adjacent end of the shaft.

7. The fractional horsepower motor of claim 4 wherein the front and rear rotor shaft bearings are substantially spherical; wherein the front bearing support is provided by an inwardly divergent bore in the front portion of the housing member, an annular retainer coaxially secured to the housing member behind the front bearing, and a resilient O-ring confined under compression between the bearing and said retainer; and wherein the rear bearing support comprises a forwardly divergent enlargement of the mouth of said well in the end frame, an annular retainer secured to the end frame in front of the rear bearing, and a resilient O-ring compressively confined between the retainer and the rear bearing.

8. The fractional horsepower motor of claim 4, wherein said means for confining the stator core and end frame against axial displacement relative to the housing member comprises: means on the housing member, near the front bearing support, defining a rearwardly facing abutment by which the stator core is held against forward displacement; a split spring ring engaged in an inwardly opening groove in the tubular side wall of the housing member, near the rear end thereof, by which the end frame is held against rearward displacement; and yielding biasing means reacting between the stator core and the end frame to urge the stator core forwardly and the end frame rearwardly.

9. In a fractional horsepower electric motor having a rotor with a shaft mounted in spaced apart front and rear bearings whereby the rotor is coaxially disposed for rotation within the fixed magnetic core of a stator, means mounting the stator core and bearings in coaxial relationship, comprising: a housing member having a tubular side wall by which the stator core is embraced and by which the stator core is engaged circumferentially spaced locations so as to be held coaxial with the housing member, said housing member also having means in front of the stator core providing a coaxial support for the front rotor shaft bearing; an end frame embraced by the tubular side wall of the housing member, behind the stator core, and thereby held coaxial with the stator core, said end frame providing a coaxial support for the rear rotor shaft bearing; means in the housing member providing a front axially facing abutment against which the stator core is engaged and a rear axially facing abutment against which the end frame is engaged; and yielding biasing means in the housing member urging the stator core axially toward the front axially facing abutment and urging the end frame axially toward the rear axially facing abutment, to thus maintain the stator core and end frame in axially fixed relationship to one another and the housing member.

10. In a fractional horsepower electric motor having a stator with an annular core of magnetic material and a rotor coaxially rotatable in the stator core on a shaft journaled in spaced apart front and rear bearings:
(A) a housing member having
(1) a tubular side wall by which the stator core is embraced and held coaxial with the housing member,
(2) means near the front of the housing member providing a coaxial front rotor shaft bearing support,
(3) a rearwardly facing thrust abutment forwardly of said bearing support and coaxial therewith, and
(4) another rearwardly facing abutment spaced radially outwardly from the bearing support and engageable with a forwardly facing surface on the stator core;
(B) means in the housing biasing the stator core forwardly into engagement with the first designated abutment to maintain the stator core in a predetermined axial position relative to the housing member;
(C) means in the housing providing a rear bearing support coaxial with the front bearing support;
(D) an end thrust bearing on the front end of the rotor shaft having a surface which converges axially outwardly to a point coaxial with the shaft; and
(E) means in the housing biasing the rotor shaft forwardly to maintain the end thrust bearing engaged with the rearwardly facing thrust abutment, thereby preventing end play of the shaft and maintaining the rotor in a predetermined axial position with respect to the housing member and the stator.

11. In a fractional horsepower electric motor having a rotor with a shaft mounted in spaced apart front and rear bearings whereby the rotor is coaxially disposed for rotation within the fixed magnetic core of an annular stator, means mounting the stator core and bearings in coaxial relationship, comprising:
(A) a housing member having
(1) a tubular side wall by which the stator core is embraced and by which the stator core is engaged at circumferentially spaced locations so as to be held coaxial with the housing member,
(2) said housing member also having means in front of the stator core providing a coaxial support for the front rotor shaft bearing;
(B) an end frame embraced by the tubular side wall of the housing member and engaged therewith at circumferentially spaced locations to be thereby held coaxial with the stator core, said end frame providing a coaxial support for the rear rotor shaft bearing;
(C) means in the housing providing a rearwardly facing abutment against which the stator core is engaged;
(D) means in the housing providing a forwardly facing abutment against which the end frame is engaged; and
(E) yielding biasing means in the housing engaging each of the stator and end frame at circumferentially spaced apart locations and urging the stator core forwardly toward the rearwardly facing abutment and the end frame rearwardly toward the forwardly facing abutment, to thus maintain the stator core and end frame in axially fixed relationship to one another and to the housing member without imposing a tilting force upon either of them that would disturb the coaxial relationship maintained by its engagement with the tubular side wall of the housing member.

12. The electric motor of claim 11, further characterized by: means for preventing relative rotation between the stator core and the end frame comprising elongated means on one of them projecting axially into the other and spaced from the axis of the tubular side wall of the housing member; and further characterized by the fact that the yielding biasing means in the housing comprises an annular spring confined between the stator core and the end frame and reacting between them, said spring being apertured to permit said elongated means to extend therethrough.

13. A self-aligned shaft bearing assembly for a fractional horsepower motor or the like, comprising:
(A) means providing a fixed bearing support having an axially inwardly converging hole therein which opens outwardly to a counterbore;
(B) a bearing of porous, oil permeable material having a spherical outer surface swivelably received in said hole;
(C) a lubricating washer of bibulous material received in the counterbore and surrounding the bearing;
(D) an annular retainer secured to the bearing support coaxially with said hole and axially outwardly of the bearing; and
(E) a resilient O-ring confined under compression between the retainer and the bearing, by which swiveling of the bearing is inhibited but not prevented and which cooperates with the bearing to prevent oil from the lubricating washer from leaking along the shaft.

References Cited in the file of this patent
UNITED STATES PATENTS

| | | |
|---|---|---|
| 2,436,540 | Allenby | Feb. 24, 1948 |
| 2,779,883 | Schumann | Jan. 29, 1957 |